(12) United States Patent
Menjak et al.

(10) Patent No.: US 6,655,493 B2
(45) Date of Patent: Dec. 2, 2003

(54) STEERING COLUMN WITH NON-COMPLIANT TORQUE SENSOR

(75) Inventors: Ratko Menjak, Frankenmuth, MI (US); James Myrl Card, Linwood, MI (US); Stephen Vincent Gillman, Linwood, MI (US)

(73) Assignee: Delphi Technologies, Inc., Troy, MI (US)

( * ) Notice: Subject to any disclaimer, the term of this patent is extended or adjusted under 35 U.S.C. 154(b) by 7 days.

(21) Appl. No.: 09/825,794

(22) Filed: Apr. 4, 2001

(65) Prior Publication Data

US 2002/0148674 A1 Oct. 17, 2002

(51) Int. Cl.⁷ .............................. B62D 3/04; B62D 5/04; B62D 6/10
(52) U.S. Cl. .............. 180/443; 73/862.333; 324/207.21
(58) Field of Search ................................. 180/443, 446; 73/862.333–862.336; 324/207.13, 207.21, 209

(56) References Cited

U.S. PATENT DOCUMENTS

| | | | | | |
|---|---|---|---|---|---|
| 5,465,210 A | * | 11/1995 | Walenty | ...................... | 180/446 |
| 5,743,351 A | * | 4/1998 | McLaughlin | ................ | 180/446 |
| 5,919,241 A | * | 7/1999 | Bolourchi et al. | .......... | 180/446 |
| 6,008,599 A | * | 12/1999 | Beck | ........................... | 180/446 |
| 6,039,144 A | * | 3/2000 | Chandy et al. | ............. | 180/446 |
| 6,050,360 A | * | 4/2000 | Pattok et al. | ............... | 180/446 |
| 6,122,579 A | * | 9/2000 | Collier-Hallman et al. | . | 180/446 |
| 6,145,387 A | * | 11/2000 | Garshelis | ............... | 73/862.336 |
| 6,250,421 B1 | * | 6/2001 | Poshado | ...................... | 180/446 |

* cited by examiner

*Primary Examiner*—Lesley D. Morris
*Assistant Examiner*—Matthew Luby (57) ABSTRACT

An electric power steering system for a vehicle comprising a hand wheel in operable communication with a shaft, a motor in mechanical communication with the shaft, and a non-compliant torque sensor located between about a mid-point along the shaft and an upper end of the shaft.

14 Claims, 11 Drawing Sheets

PRIOR ART

STEERING COLUMN WITH NON-COMPLIANT TORQUE SENSOR

BACKGROUND

In a typical electric power steering (EPS) system, a hand wheel is connected to a shaft, which comprises an upper shaft and a lower shaft connected by a torsion bar. The upper shaft connects to the hand wheel and the lower shaft connects to an intermediate shaft that ultimately connects to the rack and pinion gear of a vehicle. When the hand wheel is turned, the upper shaft rotates and a torque sensor measures the angular displacement of the torsion bar. The torque sensor is typically located at the interface between the upper and the lower shaft, which is also the location of the torsion bar. The type of torque sensor typically used has been a contacting type, which requires use of a torsion bar to measure the amount of twist on the torsion bar. The torque sensor sends a signal to the controller, which then sends a signal to the motor to begin operating. The motor powers a gear mechanism, which provides assistance in turning the lower shaft and ultimately the road wheels.

SUMMARY

An electric power steering system for a vehicle comprising a hand wheel in operable communication with a shaft, a motor in mechanical communication with the shaft, and a non-compliant torque sensor located at the shaft between about a midpoint along the shaft and an upper end of the shaft.

BRIEF DESCRIPTION OF THE DRAWINGS

Referring now to the drawings wherein like elements are numbered alike in the several Figures.

DETAILED DESCRIPTION

Figure 1:
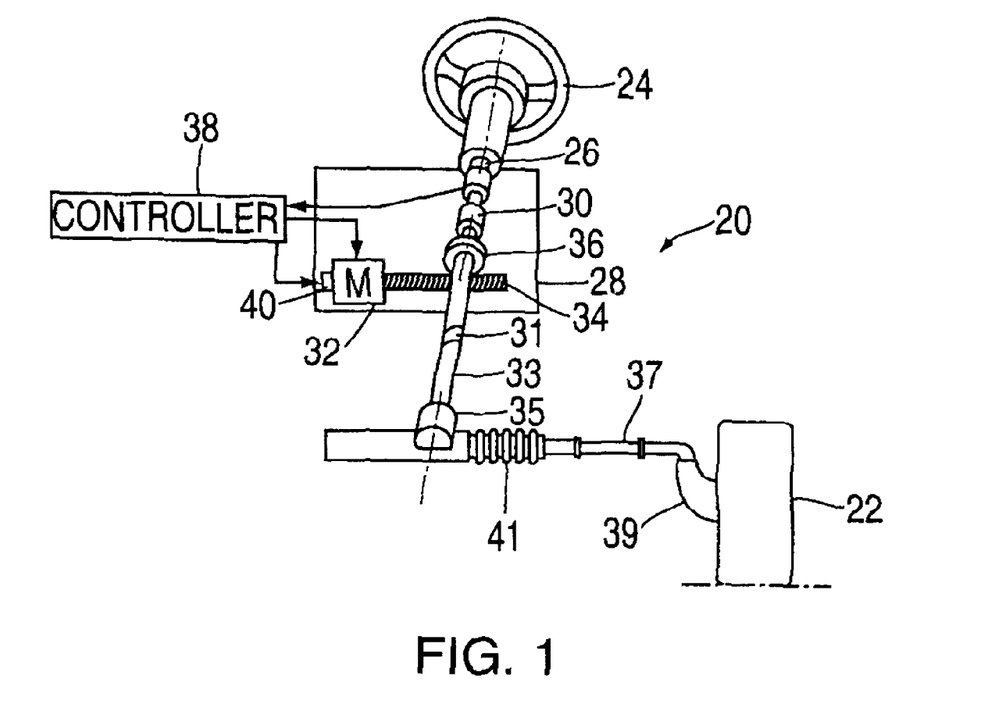
FIG. 1 is a schematic perspective view of a steering system of a vehicle.
Figure 3:
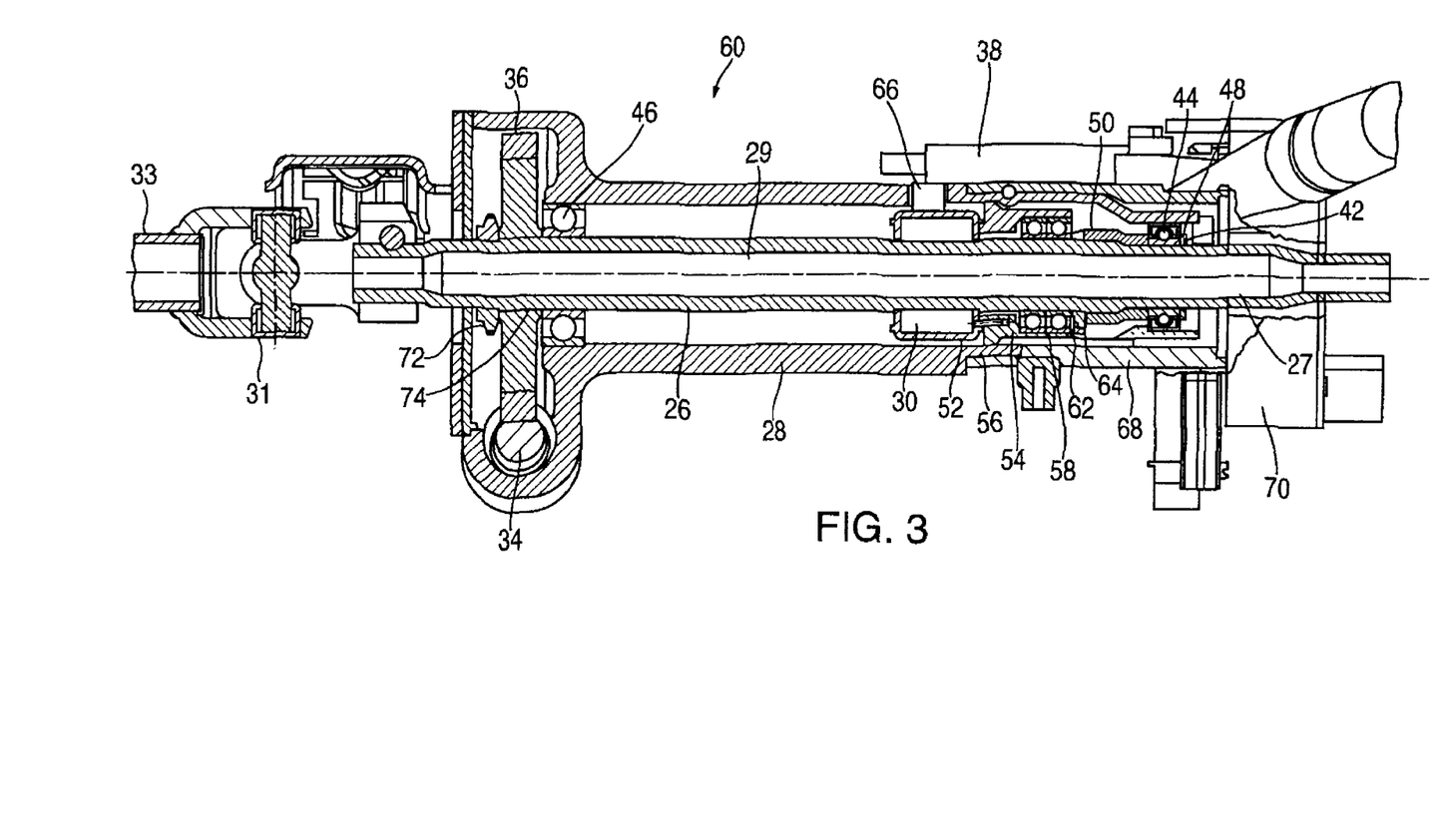
FIG. 3 is a cross-section view of an EPS system with a single shaft and single housing unit.

Referring to FIGS. 1 and 3, the steering system 20 comprises an EPS system, which is connected at a hand wheel 24 through a shaft 26 and a housing 28. The EPS system provides a driver with assistance in turning a vehicle's road wheels 22. The driver turns the hand wheel 24, which is mechanically connected to a shaft 26 The rotational force of the hand wheel 24 is transmitted to the shaft 26, which is detected by a non-compliant torque sensor 30. The non-compliant torque sensor 30 is located at the shaft 26 from about a midpoint 29 at the shaft 26 to an upper end 27 of the shaft 26. The non-compliant torque sensor 30 measures the torque applied to the shaft 26 and sends a signal to a controller 38, which may be a column electronics module. The controller 38 then sends a signal to the motor 32 to begin operation. The motor 32, which is in mechanical communication with a worm 34 and a worm gear 36, rotates the worm 34 and the worm gear 36, which provide turning assistance to the shaft 26. As the shaft 26 turns, an intermediate shaft 33, connected through a universal joint 31 rotates a pinion gear (not shown) located under a gear housing 35. Rotation of the pinion gear (not shown) moves a rack 41 which moves a tie rod 37. When the tie rod 37 moves, it turns a steering knuckle 39, which turns a road wheel 22.

A position sensor 70, which detects the position of the hand wheel (not shown), is connected to a bracket switch mounting 68, which is in operable communication with the controller 38. The bracket switch mounting 68 is mounted to the face of the housing 28. Both the position sensor 70 and the bracket switch mounting 68 are located adjacent to the hand wheel (not shown).

As stated above, the non-compliant torque sensor 30 is located anywhere from about a midpoint 29 at the shaft 26 to an upper end 27 of the shaft 26. A spacer 50 may be used to locate the non-compliant torque sensor 30 on the shaft 26 in proximity to the end of the controller 38. The non-compliant torque sensor 30 comprises a magnetometer housing 52, which is secured to a bearing housing 54 by a fastener 56. The bearing housing 54 contains a bearing 58 and a bushing 64, which supports the magnetometer housing 52 and secures it to the shaft 26. A snap ring 62 secures the bearing housing 54 to the shaft 26. Preferably, there is a connection pathway 66 in the housing 28 to directly connect the non-compliant torque sensor 30 to the controller 38, which is located on the face of the housing 28 adjacent to the hand wheel (not shown).

Figure 11:
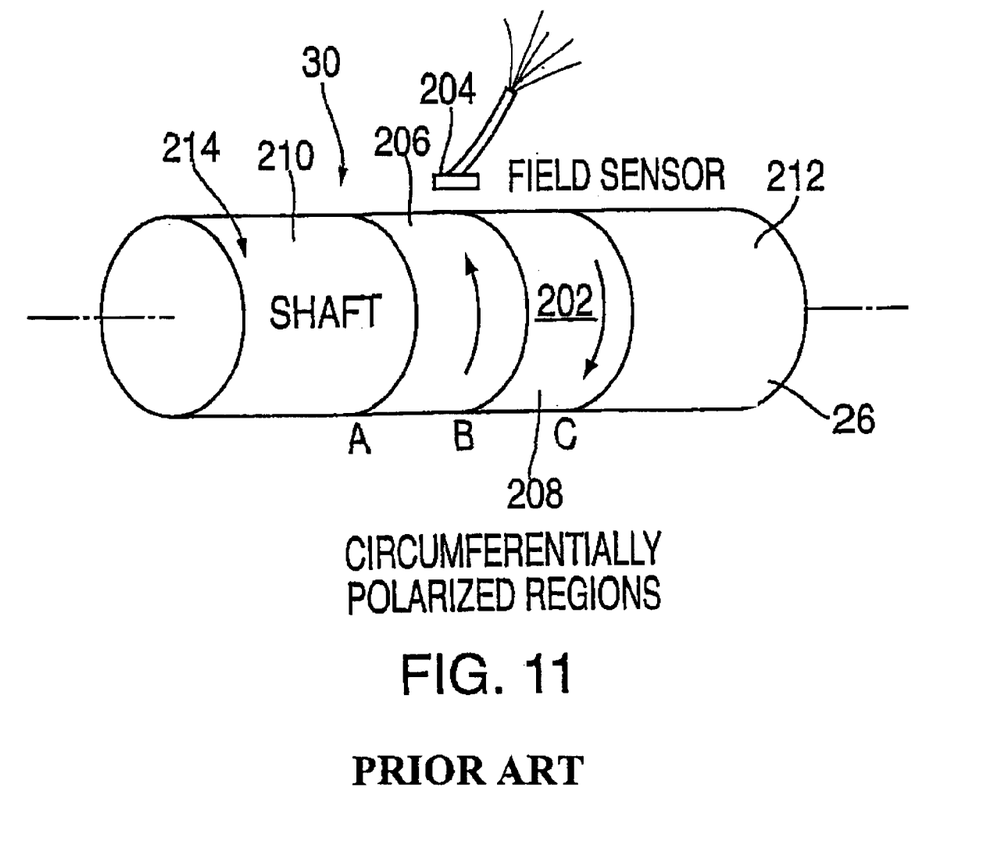
FIG. 11 is schematic perspective view of a non-compliant torque sensor.

Referring to FIG. 11, the non-compliant torque sensor 30 comprises a transducer 202 and a magnetic field vector sensor 204. The transducer 202 comprises one or more axially distinct, magnetically contiguous, oppositely polarized circumferential bands or regions 206, 208 solely defining the active or transducer region of the shaft 26. Region 210 of the shaft to the left of A and region 212 to the right of B are distinguishable from the active region only by the absence of any significant remanent magnetization. The shaft 26 is typically formed of a ferromagnetic, magnetostrictive material having a particularly desirable crystalline structure. Torque 214 is applied at one portion of the shaft 26 and is transmitted thereby to another portion of the shaft 26 where the motion of the shaft 26 due to torque 214 ultimately turns the road wheels (not shown) of the vehicle. Torque 214 is being shown as being in a clockwise direction looking at the visible end of the shaft 26, but obviously can be applied to rotate in either direction depending on the direction the driver turns the hand wheel (not shown).

A magnetic field vector sensor 204 is a magnetic field vector sensing device located and oriented relative to the transducer 202 so as to sense the magnitude and polarity of the field arising in the space about the transducer 202 as a result of the reorientation of the polarized magnetization from the quiescent circumferential direction to a more or less steep helical direction. The magnetic field vector sensor 204 provides a signal output reflecting the magnitude of torque 214 and electrically connected to the controller (not shown). The non-compliant torque sensor 30 is more fully described in U.S. Pat. No. 6,145,387, which is incorporated in its entirety herein by reference.

Figure 2:
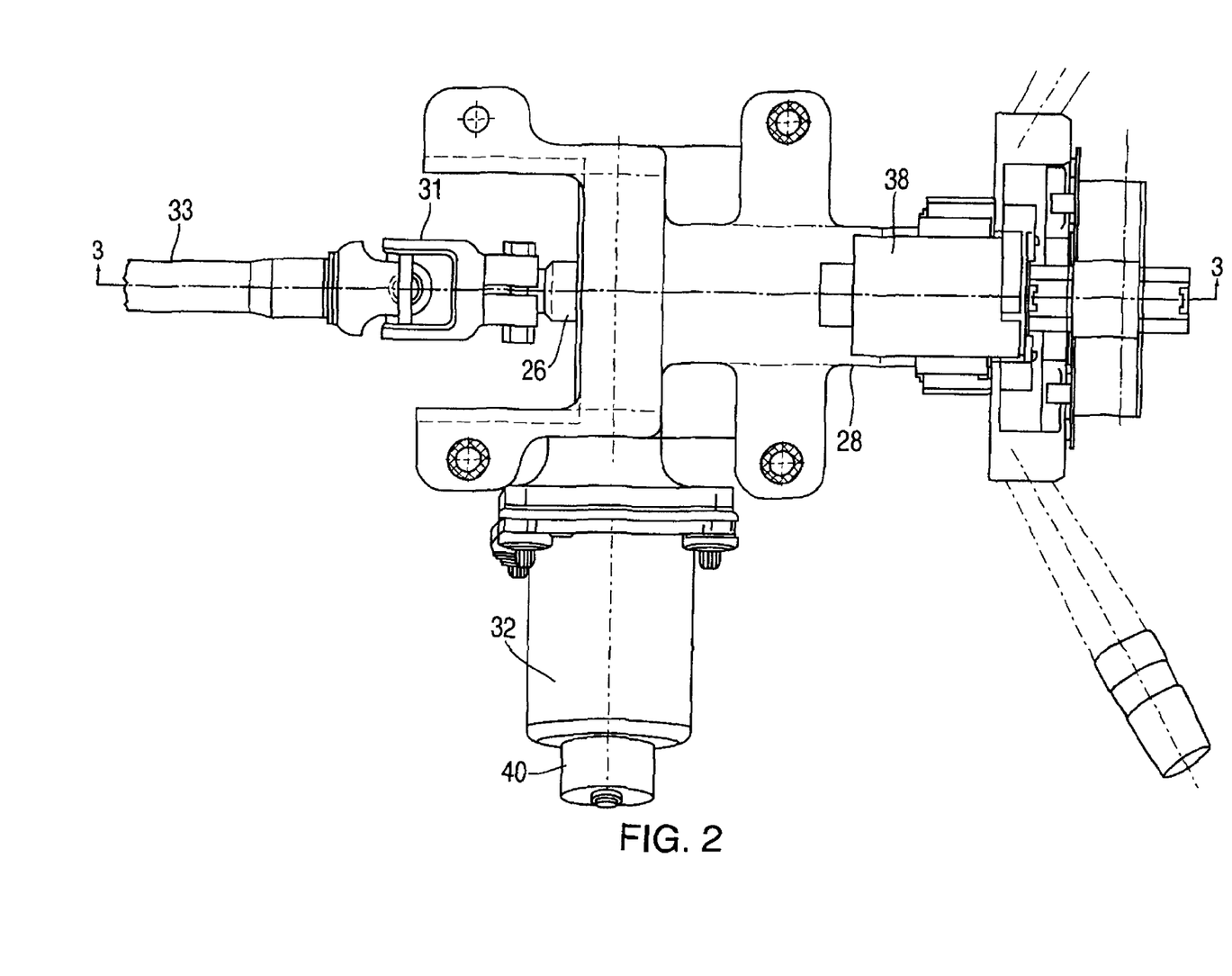
FIG. 2 is a top view of an EPS system with a motor.

Referring to FIGS. 2 and 3, when the controller 38 receives a signal from the non-compliant torque sensor 30, the controller 38 then sends a signal to the motor 32 to turn on. When the motor 32 turns on it turns the shaft 26 through a worm 34 and worm gear 36 assembly. The worm 34 is rigidly connected to a motor 32 and mounted to a worm gear 36. A worm gear 36 is mounted to the shaft 26 on splines (not shown). A spring 74 is mounted between the splines (not shown). A nut 72 supports the worm gear 36 in place along the shaft 26. A bearing 46 supports the worm gear 36 at the shaft 26.

Referring to FIG. 2, a magnetorheological fluid stopper 40 is mounted on the motor 32. The magnetorheological fluid stopper 40 is fully described in U.S. application Ser. No. 09/825,793, filed Apr. 4, 2001 entitled, "Magnetorheological Fluid Stopper At Electric Motor", which is incorporated in its entirety herein by reference.

Figure 4:
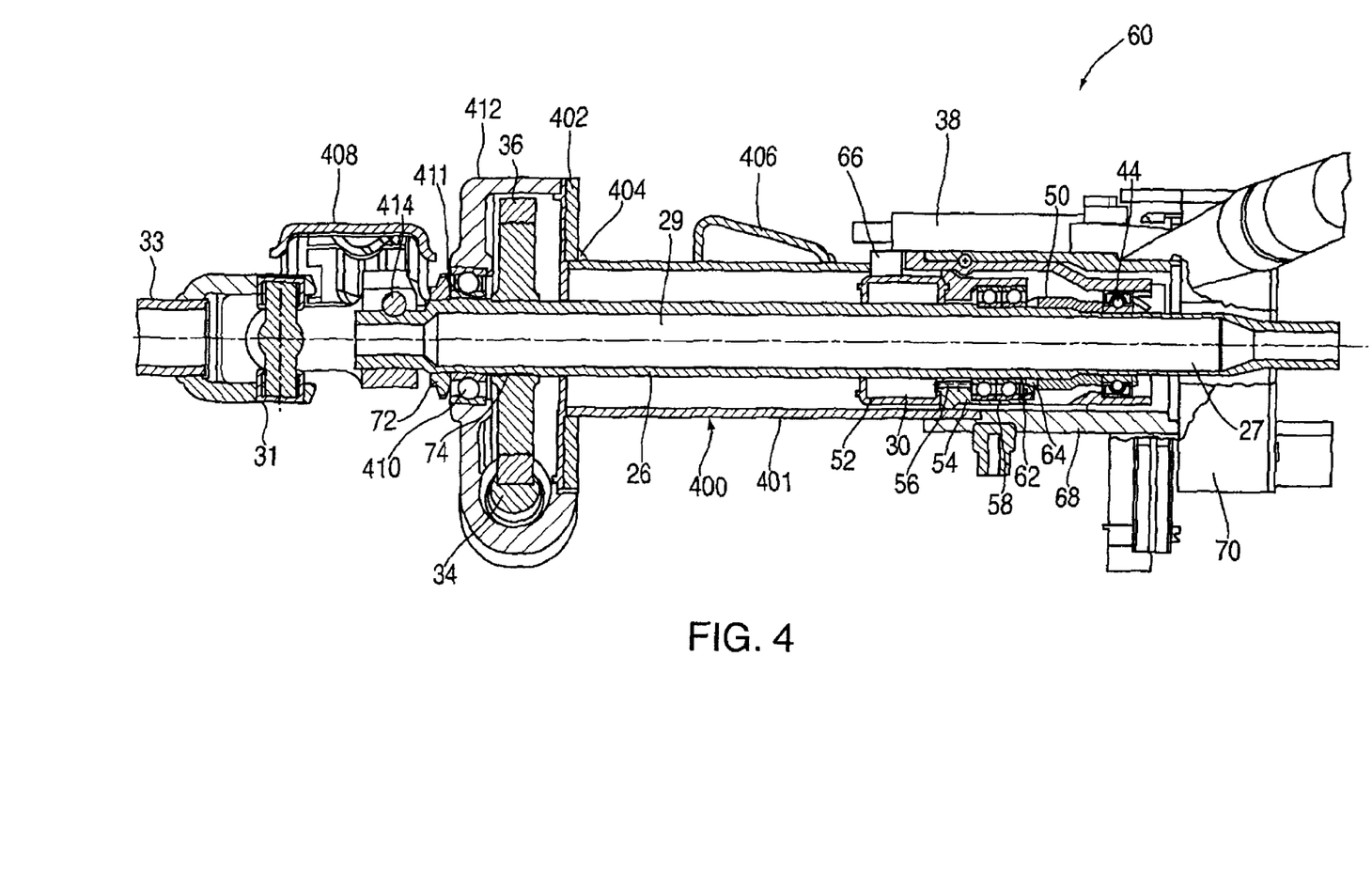
FIG. 4 is a cross-section view of an alternative embodiment EPS system with a single shaft, a bracket/jacket housing unit, and installation brackets.
Figure 5:
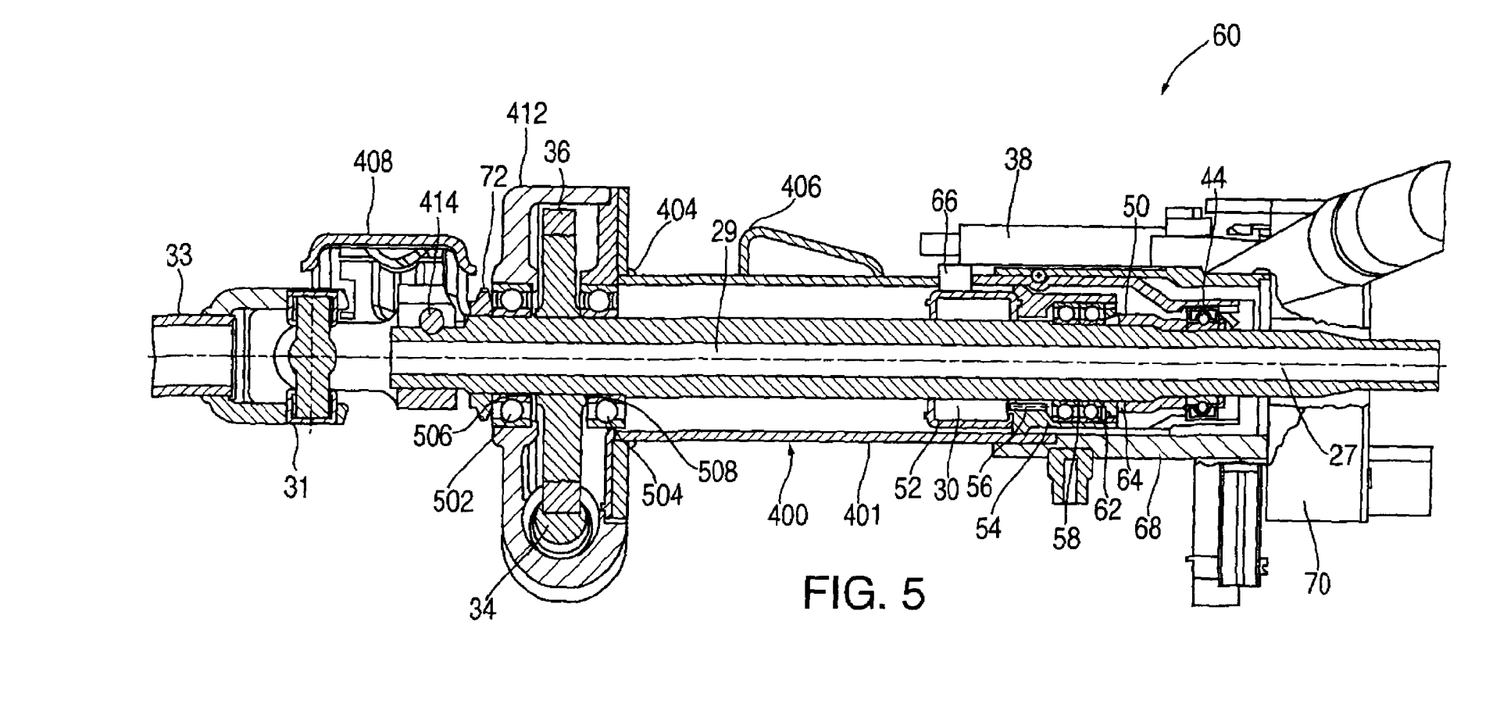
FIG. 5 is a cross-section view of an alternative embodiment EPS system with a single shaft, a bracket/jacket housing unit, installation brackets, and an additional bearing.

FIG. 4 shows an alternative embodiment of the steering column 60. This embodiment has many of the same components as the embodiment in FIG. 3, like elements being numbered alike. Distinctions are discussed hereunder. The housing 400 comprises a bracket 401 and jacket 402 secured to each other, which may be by welding shown as a weld bead 404. The housing 400 is mounted to the vehicle (not shown) by an upper installation bracket 406 and a lower installation bracket 408. The lower installation bracket 408 is attached to the shaft 26 by a bolt 414. In this embodiment, the worm gear 36 is supported by a bearing 410, which is pressed onto the shaft 26 and into a bearing recess 411. Moreover, the worm 34 and the worm gear 36 are housed in a worm gear housing 412. Referring to FIG. 5, this embodiment is similar to the embodiment described in FIG. 4, except the worm gear 36 is supported by bearings 502, 504, which are pressed onto the shaft 26 into bearing recesses 506, 508 on either side of the worm gear 36.

Figure 6:
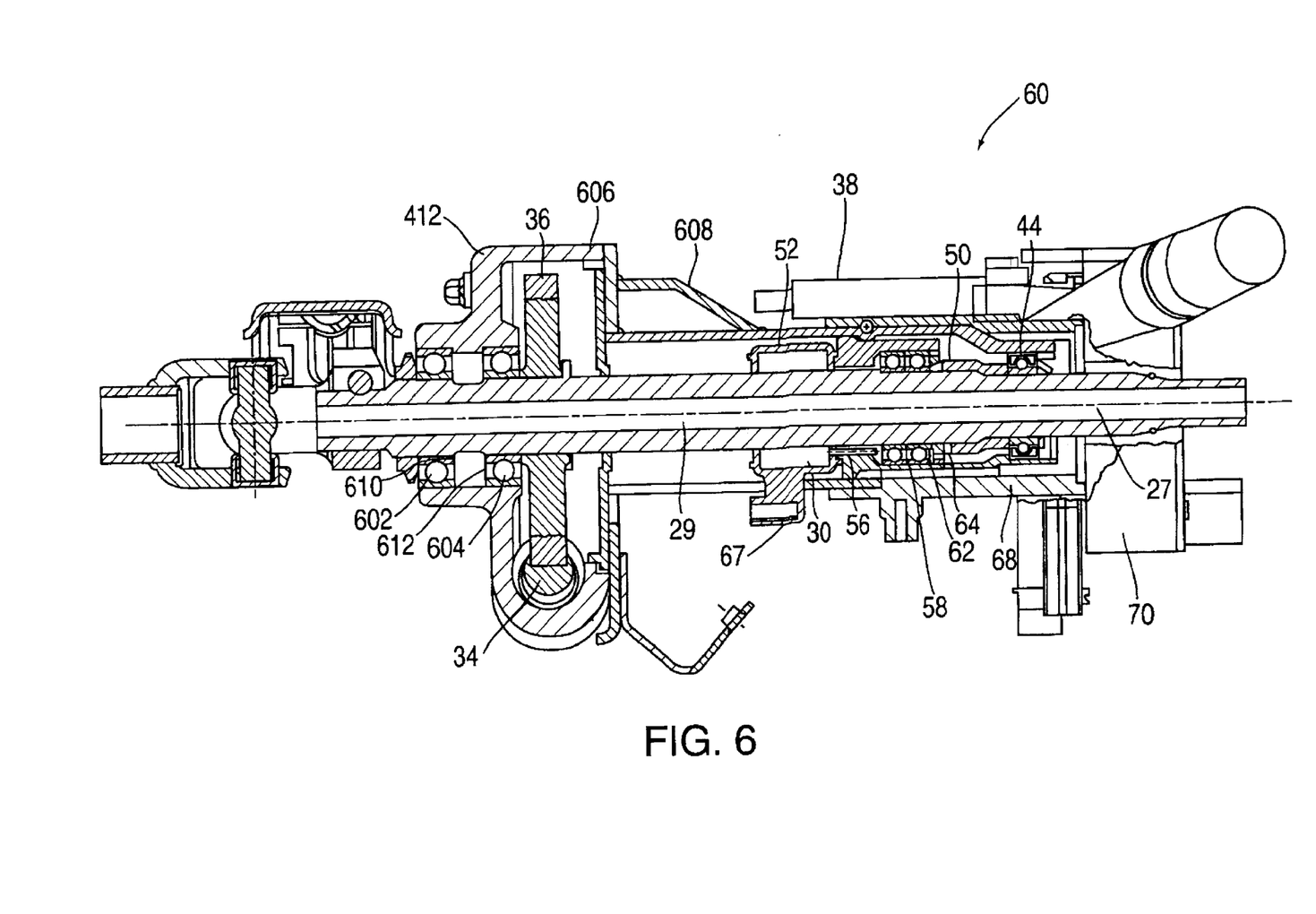
FIG. 6 is a cross-section view of an alternative embodiment EPS system with a single shaft, a bracket/jacket housing unit, installation brackets, additional bearings, and a controller that is separated from the non-compliant torque sensor.

Referring to FIG. 6, an alternative embodiment is disclosed. This embodiment is similar to the one disclosed in FIG. 4, like elements being numbered alike. The non-compliant torque sensor 30 is not directly connected to the controller 38. Instead, a plug 67 provides the connection from the non-compliant torque sensor 30 to a harness (not shown) and subsequently to the controller 38. The worm gear 36 is supported by two bearings 602, 604, which is pressed onto the shaft 26 into bearing recesses 610, 612 and located to one side of the worm gear 36. A larger worm gear housing 606 is shown, along with a different upper installation bracket 608.

Figure 7:
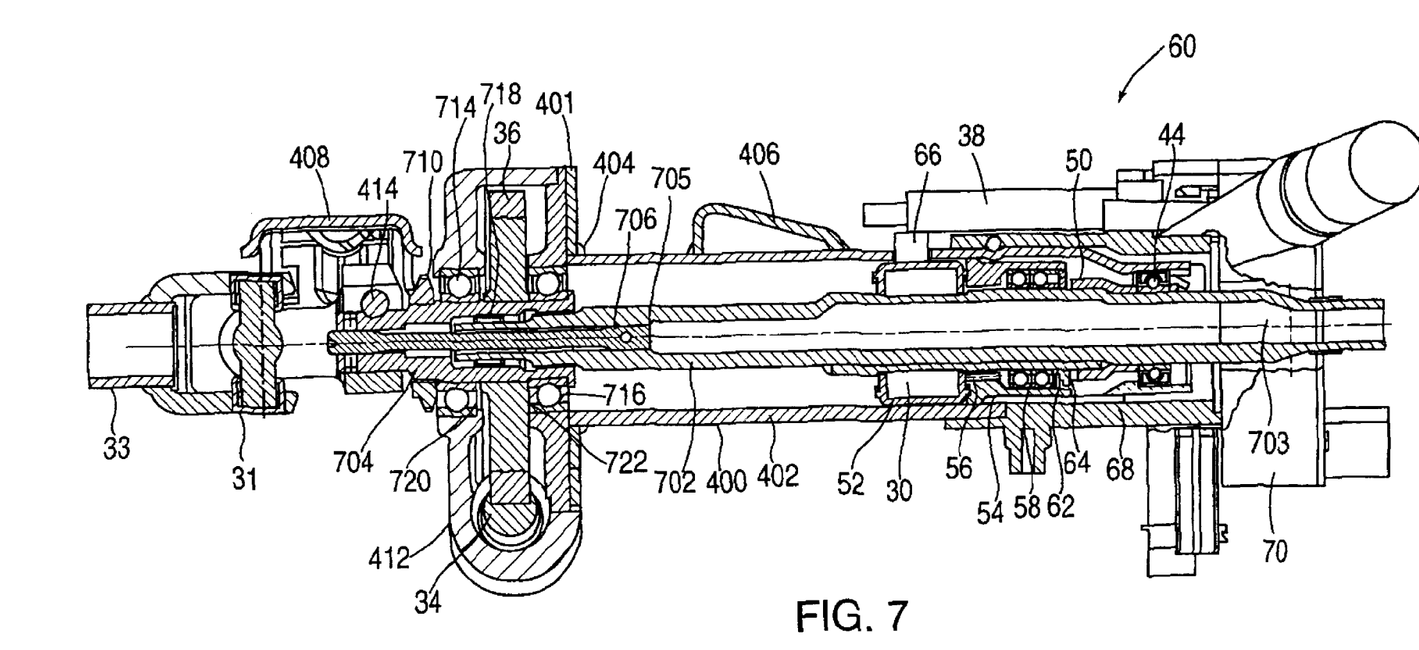
FIG. 7 is a cross-section view of an alternative embodiment EPS system with an upper shaft, a lower shaft, a torsion bar, a non-compliant torque sensor, and a controller.

FIG. 7 discloses an alternative embodiment. The driver turns a hand wheel (not shown), which is operably connected to an upper shaft 702. The upper shaft 702 is connected to a lower shaft 704 through a torsion bar 706, which is supported by a needle bearing 718. A non-compliant torque sensor 30, which is secured to an upper shaft 702, measures the torque and sends a signal to a controller 38. The controller 38 may be a column electronics module. The non-compliant torque sensor 30 is secured to the upper shaft 702 in the same method as was disclosed in FIG. 3. The non-compliant torque sensor 30 is located at the upper shaft 702 and may be located anywhere along the upper shaft 702, which may be between an upper end 703 of the upper shaft 702 and a connection 705 of the upper shaft 702 and the torsion bar 706. The spacer 50 may be used to locate the non-compliant torque sensor 30 on the upper shaft 702 in proximity to the end of the controller 38. The non-compliant torque sensor 30 is directly connected to the controller 38 through a connection pathway 66 in a housing 400. In addition, a position sensor 70 and a bracket switch mounting 68 are the same as was disclosed in FIG. 3. Once the controller 38 receives a signal from the non-compliant torque sensor 30, it then sends a signal to a motor (not shown) to turn on. When the motor (not shown) activates, it rotates the lower shaft 704 through a worm 34 and a worm gear 36 assembly. The worm 34 is connected to a motor 32 and mounted to a worm gear 36. A worm gear 36 is mounted to the lower shaft 704. The worm 34 and the worm gear 36 are housed in a worm gear housing 412. A nut 710 presses a bearing 714 to the worm gear housing 412 along the lower shaft 704. The lower shaft 704 is connected to an intermediate shaft 33 through a universal joint 31.

The housing 400 for the steering column 60 comprises a bracket 401 and jacket 402 fixably attached to each other, which may be by welding shown as a weld bead 404. The housing 400 is mounted to the vehicle (not shown) by an upper installation bracket 406 and a lower installation bracket 408. Two bearings 714, 716, which are pressed onto the lower shaft 704 and into bearing recesses 720, 722, support the worm gear 36 at the lower shaft 704. The lower installation bracket 408 is attached to the lower shaft 704 by a bolt 414.

Figure 8:
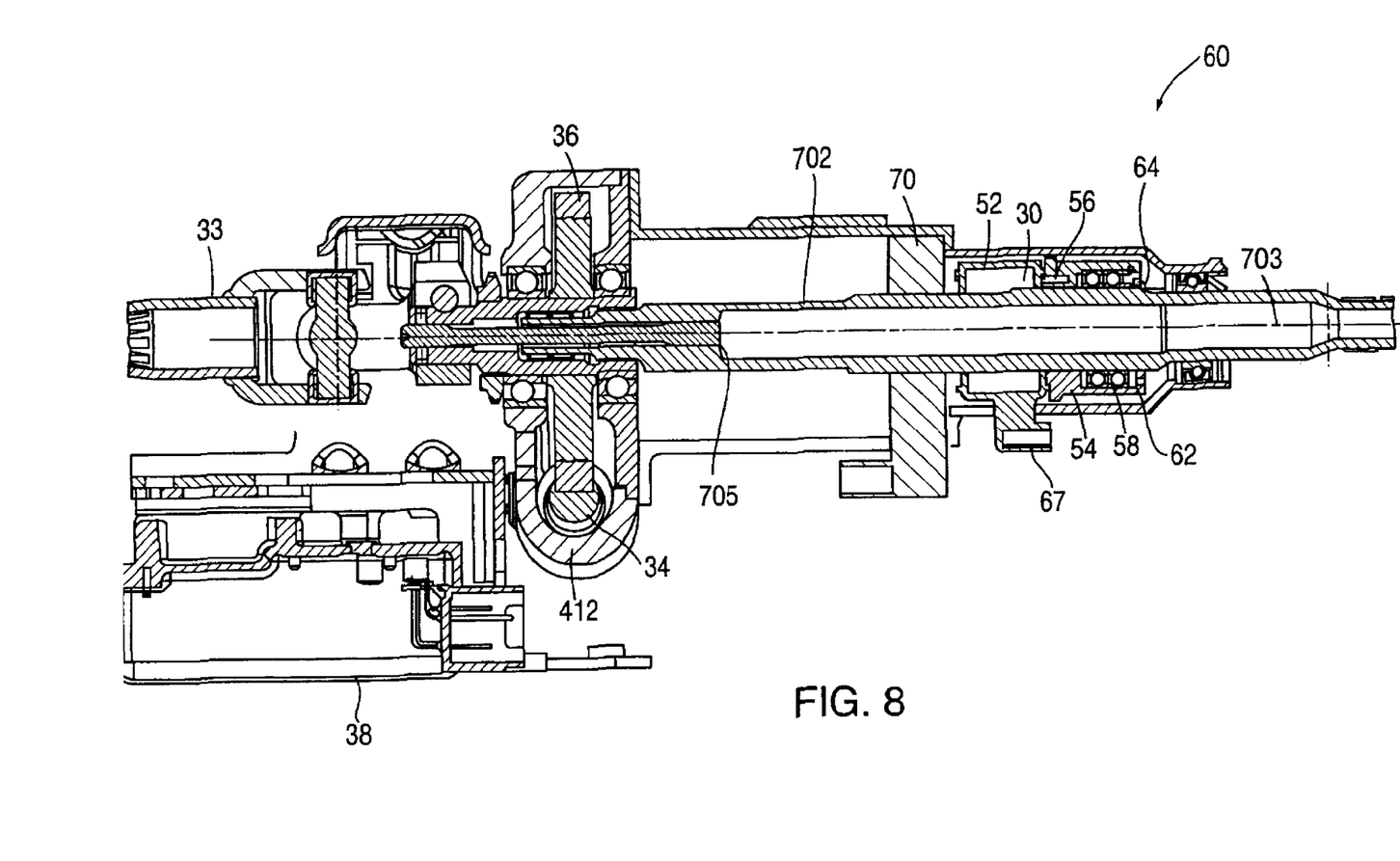
FIG. 8 is a cross-section view of an alternative embodiment EPS system with an upper shaft, a lower shaft, a torsion bar, and a non-compliant torque sensor.

Referring to FIG. 8, an alternative embodiment is disclosed. The embodiment is similar to the one disclosed in FIG. 7, like elements being numbered alike. The controller 38 is attached to the worm gear housing 412. As such, the non-compliant torque sensor 30 is not directly connected to the controller 38. A plug 67 located on the non-compliant torque sensor 30 provides the connection from the non-compliant torque sensor 30 to the controller 38. The position sensor 70 is also located on the other side of the non-compliant torque sensor 30 and is between the non-compliant torque sensor 30 and the worm gear housing 412. The position sensor is operatively connected to the upper shaft 702. Moreover, there is no spacer locating the non-compliant torque sensor 30 along the upper shaft 702.

Figure 9:
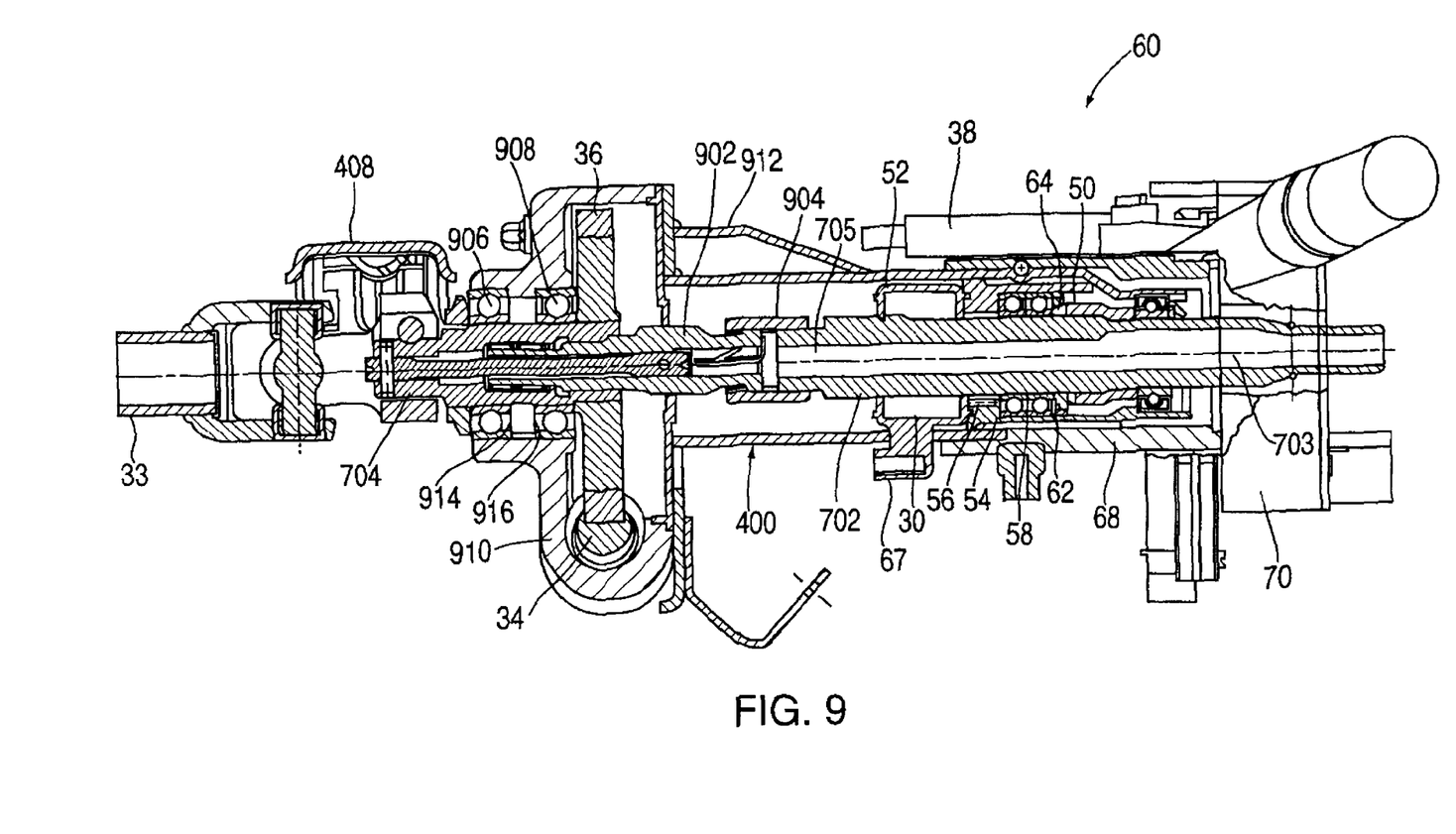
FIG. 9 is a cross-section view of an alternative embodiment EPS system with an upper shaft, a lower shaft, a torsion bar, a joint, a non-compliant torque sensor, and a controller.

Referring to FIG. 9, an alternative embodiment is disclosed. The embodiment is similar to the one disclosed in FIG. 7, like elements being numbered alike. The upper shaft 702 is operably connected to a spool shaft 902 through a joint 904 to permit angular adjustments. There are two bearings 906, 908, which are pressed onto the lower shaft 704 and into bearing recesses 914, 916 and support the lower shaft 702 and the worm gear 36 along the lower shaft 702. The non-compliant torque sensor 30 is not directly connected to the controller 38; rather a plug 67 is provided for the electrical connection. Moreover, the worm gear housing 910 is bigger and a different upper installation bracket 912 is utilized to mount the housing 400 to the vehicle (not shown).

Figure 10:
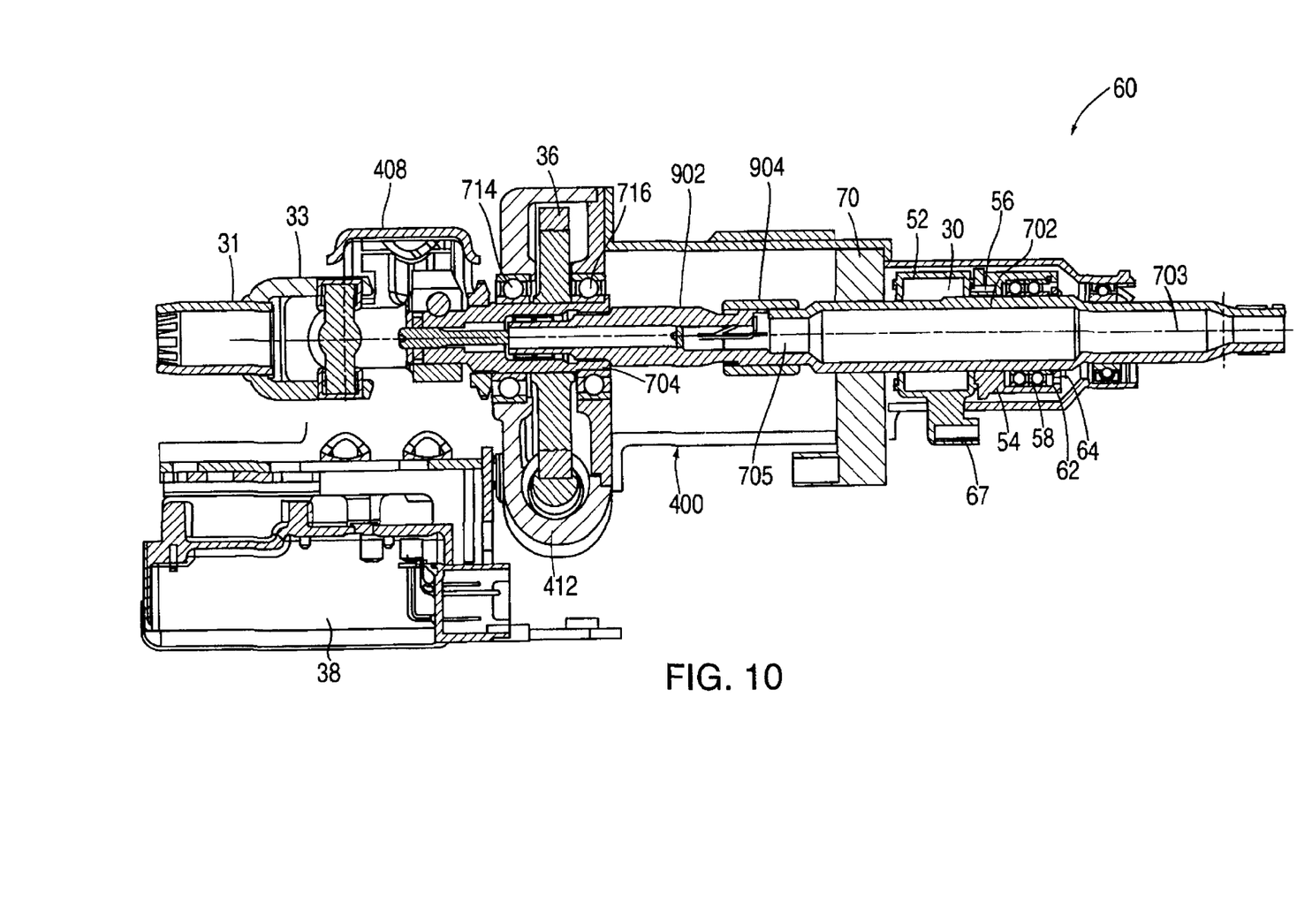
FIG. 10 is a cross-section view of an alternative embodiment EPS system with an upper shaft, a lower shaft, a controller, and a non-compliant torque sensor.

Referring to FIG. 10 an alternative embodiment is disclosed. The embodiment is similar to the one disclosed in FIG. 9, with the exception of the following parts. The controller 38 is attached to the worm gear housing 412. As such, the non-compliant torque sensor 30 is not directly connected to the controller 38. A plug 67 located at the non-compliant torque sensor 30 provides the connection from the non-compliant torque sensor 30 to the controller 38. The position sensor 70 is also located on the other side of the non-compliant torque sensor 30 and is between the non-compliant torque sensor 30 and the worm gear housing 412. Moreover, the worm gear housing is similar to the one disclosed in FIG. 7 and there is no spacer locating the non-compliant torque sensor 30 along the upper shaft 702.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A steering column for a vehicle comprising:
   a shaft controlled by a hand wheel;
   a gear assembly in mechanical communication with said shaft;
   a motor in mechanical communication with said gear assembly;
   a controller in operable communication wit said motor;
   a non-compliant torque sensor located at said shaft and located between about a midpoint along said shaft and an tipper end of said shaft;
   a position sensor in electronic communication with said controller and connected to a bracket switch mounting;
   a housing disposed around said shaft; and
   wherein said non-compliant torque sensor is directly connected to said controller through a connection pathway in said housing.
2. The steering column in claim 1, wherein said housing includes a bracket connected to a jacket.
3. The steering column in claim 1, wherein said controller is mounted on a face of said housing adjacent to said hand wheel.
4. The steering column in claim 1, wherein said controller is a column electronics module.
5. The steering column in claim 1, wherein said gear assembly comprises a worm and a worm gear.
6. The steering column in claim 5, wherein said worm and said worm gear are housed in a worm gear housing.
7. The steering column in claim 1, wherein said housing is a single cast housing.
8. The steering column in claim 1, wherein said shaft comprising a single shaft.
9. An electric power steering system for a vehicle comprising:
   a hand wheel in operable communication with a shaft;
   a motor in mechanical communication with said shaft;
   a non-compliant torque sensor located at said shaft and located between about a midpoint along said shaft and an upper end of said shaft;
   a housing disposed around said shaft;
   a controller in operable communication with said motor, wherein said controller is mounted on a face of said housing adjacent to said hand wheel; and
   wherein said non-compliant torque Sensor is directly connected to said controller through a connection pathway in said housing.
10. The electric power steering system in claim 9, wherein said controller is a column electronics module.
11. The electric power steering system in claim 9, wherein said gear assembly comprises a worm and a worm gear.
12. The electric power steering system in claim 9, wherein said worm and said worm gear are housed in a worm gear housing.
13. The electric power steering system in claim 9, wherein said housing is a single cast housing.
14. The electric power steering system in claim 9, wherein said shaft comprises a single shaft.

* * * * *